Sept. 18, 1956     E. F. KLESSIG ET AL     2,763,217

POWER TRANSMISSION

Filed Feb. 7, 1951

INVENTOR.
ERNST F. KLESSIG
ADOLF KEEL
BY

United States Patent Office 2,763,217
Patented Sept. 18, 1956

2,763,217
POWER TRANSMISSION

Ernst F. Klessig, Berkley, and Adolf Keel, Highland Park, Mich., assignors to Vickers Incorporated, Detroit, Mich., a corporation of Michigan Application February 7, 1951, Serial No. 209,802

13 Claims. (Cl. 103—136)

This invention relates to power transmissions, and is particularly applicable to those of the type comprising two or more fluid pressure energy translating devices, one of which may function as a pump and another as a fluid motor.

This invention is concerned generally with rotary fluid pumps and in particular with those of the rotary vane type. The present invention deals with pumps of the type mentioned wherein there are formed a plurality of fluid intake zones and a plurality of fluid outlet zones necessitating a construction enabling fluid to be conducted from a single inlet connection port to all of the fluid inlet zones and enabling fluid to be conducted from the plurality of fluid outlet zones to a single outlet connection.

In many applications it is not only desirable but necessary that the inlet and outlet connection ports be on one side of the pump. This presents the problem of providing inlet and outlet passages in the housing for the multiple sets of fluid inlet and outlet zones without intricate coring and a multiplicity of passages which would make the cost of the device excessive. It presents a more difficult problem where the pump is to be provided with a pressure delivery chamber within which is floatably mounted a pressure responsive cheek plate adapted to be maintained in fluid sealing engagement against the pump mechanism. In this type of construction the cheek plate is maintained in fluid sealing engagement against the pumping mechanism by fluid pressure in the chamber and the proper running clearance between the surfaces against which the rotor turns is thus automatically maintained. The problem becomes more complicated where it is desired to retain the features of radial balance and of pressure loaded cheek plate construction for maintaining proper rotor running clearance, and the device is to be utilized in installations requiring the inlet and outlet connections to be on one side of the body and the drive shaft to extend from the same side of the body.

It is an object of the present invention to provide a novel, simple, and economical way of connecting up the multiplicity of fluid inlet and outlet zones of the pumping mechanism respectively to the external connection inlet and outlet ports.

It is another object of this invention to provide in rotary pumps of the type mentioned, wherein the inlet and outlet connections are on one side of the pumping mechanism and which utilize a pressure responsive cheek plate in a delivery chamber for maintaining proper rotor clearance, an improved fluid inlet and outlet passage construction located completely on one side of the body.

It is a further object of this invention to provide in a rotary type of pump having a plurality of fluid inlet zones and a plurality of fluid outlet zones and wherein the inlet and outlet connections are on one side of the pumping mechanism, an improved and simplified type of construction wherein the total displacement of the pumping mechanism is delivered to the outlet passage through only one of the fluid zones.

Specifically, it is an object of this invention to provide the features recited for rotary pumps having the inlet and outlet connection on one side of the body and the drive shaft extending from the same side of the body.

It is still another object of this invention to provide a simplified low cost structure of the aforementioned type having advantages contributing to efficiency, reliability, and long life as well as ease of maintenance.

Further objects and advantages of the present invention will be apparent from the following description, reference being had to the accompanying drawings wherein a preferred form of the present invention is clearly shown.

Figure 1:
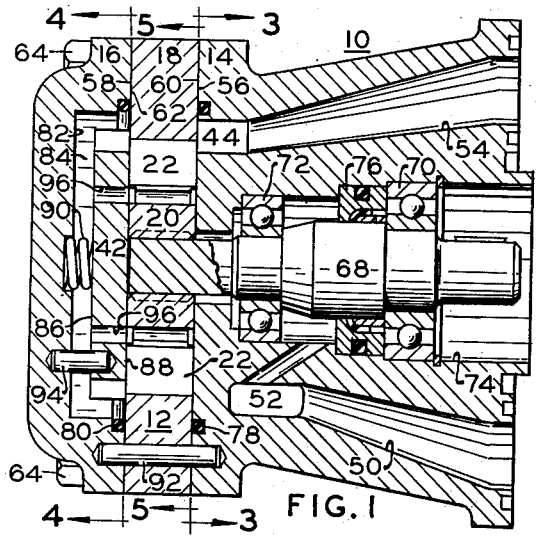
Figure 1 is a sectional view of a preferred form of the present invention taken on line 1—1 of Figure 2.

Referring to Figure 1 there is shown a rotary vane pump 10 comprising a central pumping unit indicated generally by the numeral 12 mounted between a right end housing member 14 and a left end member 16.

Figure 5:
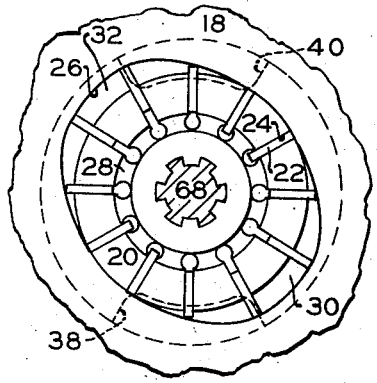
Figure 5 is a view taken on line 5—5 of Figure 1.

The pumping unit 12 comprises a cam ring 18, the space within which is utilized as a pumping chamber for mounting a hubless rotor 20, shown in Figure 5, carrying vanes 22 which reciprocate in slots 24. The outer ends of the vanes are maintained against the inner, noncircular contour of the ring indicated by the numeral 26, which forms a track for the vanes, by pressure fluid conducted to the enlarged inner ends of the vane slots in a manner hereinafter described. The rotor is provided with a circular pressure groove 28 connected to the enlarged ends of the vane slots and to which pressure fluid is delivered.

With the rotor 20 mounted within the pumping chamber of the cam ring 18 two opposing working chambers 30 and 32 are formed. These chambers may be appropriately divided into a set of fluid intake zones and a set of fluid delivery zones through which the vanes move as the rotor turns. The set of inlet fluid zones comprise the portions of the chambers 30 and 32 registering with a set of inlet fluid openings 34 and 36 of the housing member 14, and shown in Figure 3. The set of delivery fluid zones comprise those portions of the chambers 30 and 32 registering with a set of delivery ports 38 and 40 in a cheek plate 42 mounted in the end member 16, and shown in Figure 4, said cheek plate being mounted immediately adjacent the pumping unit 12. A fluid outlet or delivery opening 44 is also formed in the housing member 14 which registers with only one of the fluid delivery zones, said delivery zone being the same delivery or outlet zone with which the delivery port 40 of the cheek plate 42 registers with on the opposite side of the pumping unit 12. As will later be explained, this arrangement permits the entire displacement of the pumping unit 12 to be conducted through only one of the fluid delivery zones to an outlet passage formed in the housing 14.

Figure 2:
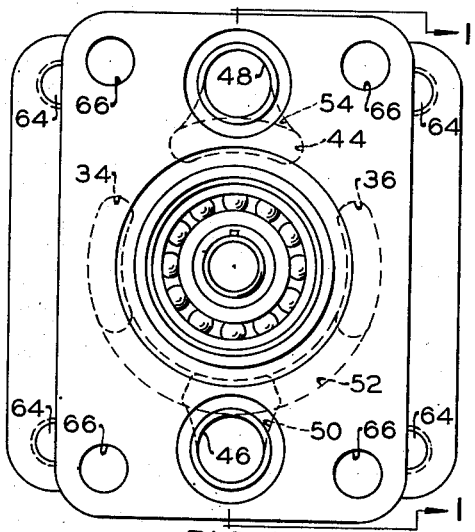
Figure 2 is an end view of the present invention.
Figure 3:
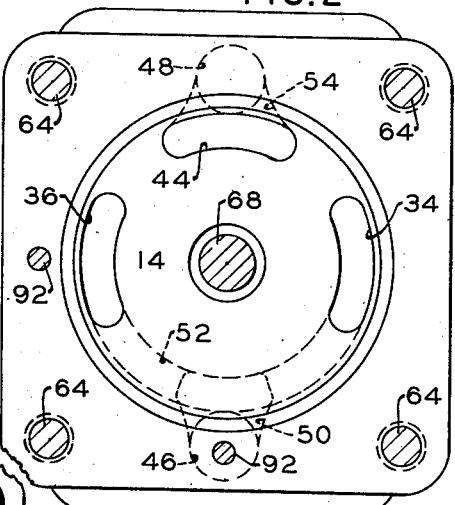
Figure 3 is a view taken on line 3—3 of Figure 1.
Figure 4:
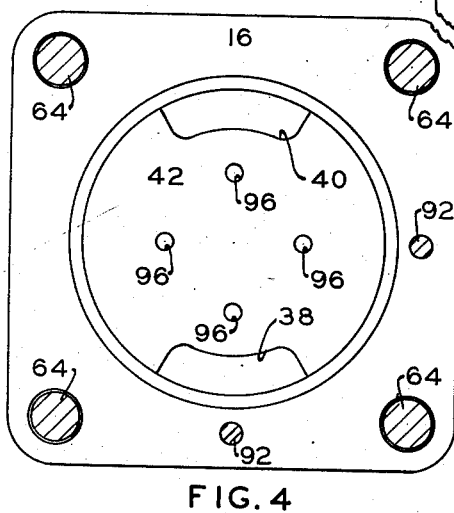
Figure 4 is a view taken on line 4—4 of Figure 1.

Referring to Figures 1, 2, and 3, the housing member 14 is provided with an external inlet connection port 46 and an external outlet or delivery connection port 48. The inlet port 46 leads by a cored passage 50 to a main cored passage 52, the opposite ends of which are provided with a set of inlet fluid openings 34 and 36 registering with the set of fluid inlet zones. The delivery connection port 48 is connected to the delivery zone of the pumping unit 12 by a cored passage 54 which is provided with the fluid delivery opening 44.

The cam ring 18 is provided with parallel plane sides indicated by the numerals 56 and 58 which mate with the plane sides 60 and 62, respectively, of the members 14 and 16. The cam ring 18 and housing members 14 and 16 are maintained in abutting relationship by means of screws 64 extending from housing 16, through the cam ring 18 and into the housing 14. Holes 66 are provided in the housing member 14 which extend therethrough and through which screws or bolts may be inserted for mounting the device.

A drive shaft 68 spline connected to the rotor 20 is rotatably supported within bearings 70 and 72 mounted within a stepped bore 74 of the housing 14. A seal 76 is provided for the shaft 68 immediately adjacent the bearing 70 and seals 78 and 80 are provided in the housing members 14 and 16 immediately adjoining and on opposite sides of the cam ring 18.

The end housing member 16 is provided with a recess 82, the open end of which is closed by the cam ring 18 and rotor 20 to form a delivery chamber indicated by the numeral 84. The chamber is thus immediately adjacent the rotor and pumping chambers on the opposite side of the rotor to the inlet and outlet passages in the housing 14.

The cheek plate 42 is floatably mounted within and supported by the walls of the chamber. Pressure fluid within the chamber 84 acting on the exposed side of the cheek plate indicated by the numeral 86 maintains the opposite side thereof indicated by the numeral 88 in engagement with a portion of the mating side 58 of the cam ring 18, and in fluid sealing engagement against the rotor 20. The thickness of the rotor 20 is slightly less than the thickness of the cam ring 18 and the proper running clearance for the rotor is thus automatically maintained by the cheek plate which is responsive to the pressure existing at the outlet side of the device. At starting and at extremely low pressures the cheek plate is maintained in engagement against the cam ring and in fluid sealing engagement with the rotor by a spring 90.

The cam ring 18 is properly aligned with the housing members 14 and 16 by means of dowel pins 92 extending from the cam ring 18 on opposite sides thereof into the adjoining housing members 14 and 16. The cheek plate 42 is properly aligned with the pumping unit 12 by means of dowel pins 94 extending from the cheek plate into the housing member 16.

The cheek plate 42 is provided with a plurality of ports 96 extending therethrough which register with the pressure groove 28 of the rotor 20. In this manner pressure fluid from the delivery chamber is conducted to the enlarged inner ends of the vane slots to urge the vanes outwardly into contact with the vane track.

In operation, with the rotor turning clockwise, as viewed in Figure 5, fluid is conducted to the inlet fluid zones of the pumping chamber by means of external port 46, passages 50 and 52 and the diametrically opposed inlet openings 34 and 36. As the vanes move through the delivery zone registering with the delivery opening 44 in the housing 14, fluid will be forced out of said zone through the opening 44 into the delivery passage 54 and to the external connection delivery port 48. Fluid in the delivery zone registering with the delivery port 38 will be forced out of said zone and conducted through the cheek plate port 38 to the delivery chamber 84. Fluid being constantly delivered to the delivery chamber is conducted from said chamber to the outlet connection port 48 by means of the cheek plate delivery port 40, the fluid delivery zone registering therewith, fluid delivery opening 44 in the housing 14 and passage 54.

Pressure fluid in the delivery chamber 84 acting on the exposed side 86 of the cheek plate 42 will maintain the flat surface 88 of the cheek plate in engagement against the cam ring 18 and in fluid sealing engagement with the rotor 20.

Thus the fluid delivery zone registering with the fluid delivery opening in the housing 14 serves as a delivery port for the entire displacement of the pumping unit 12. By this arrangement the inlet and outlet connection ports and their associated inlet and outlet passages which must be connected to the plurality of fluid inlet and fluid delivery zones of the pumping mechanism may be located completely on one side of the housing. A single outlet passage rather than a plurality of passages may be utilized because the cheek plate which is provided for maintaining proper rotor clearance is also utilized to direct the fluid displacement from all but one of said fluid zones to the fluid delivery zone connected to the outlet passage. As previously stated the last mentioned delivery zone performs as a delivery port in connecting the fluid delivered into the delivery chamber to the single outlet passage.

The feature of radial balance achieved through providing opposing sets of fluid inlet zones and fluid delivery zones is retained as is the feature of a pressure loaded cheek plate responsive to the pressure in the chamber for maintaining proper rotor running clearance. These features are retained without added costs of intricate coring and passages in spite of the fact that the inlet and outlet connections and passages associated therewith are on one side of the pumping mechanism opposite to that of the delivery chamber.

The construction also enables the connections and passages to be constructed in the same side of the housing from which the drive shaft extends.

While the form of embodiment of the invention as herein disclosed constitutes a preferred form, it is to be understood that other forms might be adopted, all coming within the scope of the claims which follow.

What is claimed is as follows:

1. In a rotary fluid energy translating device the combination of a stator having externally located inlet and outlet connections, a rotor mounted therein and forming a set of fluid inlet zones and a set of fluid delivery zones, a first passage having branches leading from one of said connections directly to one set of the fluid zones and completely on one side of the rotor, means forming a recess on the opposite side of the rotor and immediately adjacent thereto, a cheek plate in the recess one side of which is maintained in fluid sealing engagement against the rotor and forming a chamber on the other side of the cheek plate, a plurality of fluid ports in the cheek plate registering with the other set of fluid zones and extending therethrough to the chamber, and a second passage completely on the same side of the rotor as the first passage leading directly from only one zone of said other set of fluid zones to the other of said connections.

2. In a rotary fluid energy translating device the combination of a stator having externally located inlet and outlet connections, means forming a working chamber in the stator, a rotor mounted in the working chamber and forming a set of fluid inlet zones and a set of fluid delivery zones, a first passage having branches leading from one of said connections directly to one set of the fluid zones and completely on one side of the rotor, means forming a recess in the stator on the opposite side of the rotor and immediately adjacent thereto, a cheek plate floatably mounted in the recess and forming a pressure chamber, said cheek plate having a set of fluid ports registering with the other set of fluid zones and extending therethrough to the pressure chamber, said cheek plate enclosing the working chamber and being maintained in fluid sealing engagement against the rotor by fluid pressure in the pressure chamber, and a second passage completely on the same side of the rotor as the first passage leading directly from only one zone of said other set of fluid zones to the other of said connections.

3. A rotary, vane fluid energy translating device comprising a housing having a working chamber, said housing having externally located inlet and outlet connections, a slotted rotor having a plurality of substantially radially movable vanes and mounted in the chamber to form a set of fluid inlet zones and a set of fluid outlet zones through which the vanes move as the rotor turns, a first branched passage completely on one side of the rotor and leading from one of said connections directly to one set of the fluid zones, means forming a recess in the housing on the opposite side of the rotor to that of the said first branched passage and immediately adjacent thereto, a cheek plate mounted in the recess in fluid sealing engagement against the rotor and forming a fluid chamber, said cheek plate having a set of fluid ports registering with the other set of fluid zones and extending to the fluid chamber, and a second passage completely on the same side of the rotor as the first passage leading directly from only one zone of said other set of fluid zones to the other of said connections.

4. In a rotary fluid energy translating device the combination of a stator having externally located inlet and outlet connections, a rotor mounted therein and forming a set of fluid inlet zones and a set of fluid delivery zones, a branched passage in the stator on one side of said rotor leading from one of said connections directly to one set of the fluid zones, means forming a recess in the stator on the other side of the rotor to that of said branched passage and immediately adjacent the rotor, a cheek plate in the recess maintained in fluid sealing engagement against the rotor and forming a fluid chamber, a set of fluid ports in the cheek plate registering with the other set of fluid zones and extending therethrough to the chamber, and a second passage leading from only one zone of said other set of fluid zones from the side of the rotor opposite the chamber to the other of said connections.

5. In a rotary, vane fluid energy translating device the combination of a housing having a working chamber and externally located inlet and outlet connections, a rotor carrying a plurality of movable vanes mounted in the chamber and together with the chamber forming a set of fluid inlet zones and a set of fluid delivery zones, a branched passage in the housing leading from one of said connections to all zones of one set of the zones, means forming a recess in the housing immediately adjacent the working chamber and the rotor on one side thereof, a cheek plate in the recess and forming a pressure chamber, and cheek plate being maintained in fluid sealing engagement with the rotor and enclosing the working chamber, a set of fluid ports extending through the cheek plate, said ports registering with the other set of fluid zones and connecting the same to the pressure chamber, and a second passage leading from only one zone of said other set of fluid zones from the side of the rotor opposite the pressure chamber to the other of said connections.

6. In a rotary fluid energy translating device the combination of a central working unit having parallel plane sides and provided with a set of fluid inlet zones and a set of fluid delivery zones opening on opposite sides of the working unit, a housing member on each side of the working unit, one of the housing members having a recess the open end of which is closed by the working unit, and a cheek plate in the recess maintained in fluid sealing engagement against the working unit and forming a pressure chamber, said cheek plate having a plurality of fluid ports registering on one side with one set of the fluid zones and extending through the cheek plate to the pressure chamber, and said other housing member having an inlet and outlet connection and two passages, one passage leading directly from one of said connections to only one zone of said one set of fluid zones and the other passage leading from the other of said connections directly to all of the zones of the other set of fluid zones.

7. In a rotary, vane fluid energy translating device the combination of a central working unit having parallel plane sides and including a stationary cam ring and an inner vane carrying rotor together providing a set of fluid inlet zones and a set of fluid delivery zones, a housing member on one side of the working unit having a recess the open end of which is immediately adjacent to and closed by the working unit, a cheek plate mounted in the recess in fluid sealing engagement with the working unit and forming a pressure chamber, said cheek plate having a plurality of fluid ports extending therethrough and connecting one set of the fluid zones to the pressure chamber, and a housing member on the opposite side of the unit having externally located inlet and outlet connections and two passages, one of said passages leading directly from only one zone of said one set of fluid zones to one of said connections, and the other passage leading directly from one of said connections to all of the zones of the other set of fluid zones.

8. In a rotary fluid energy translating device the combination of a stator having externally located inlet and outlet connections, a rotor mounted therein and forming a set of fluid inlet zones and a set of fluid delivery zones, a first passage in the stator completely on one side of the rotor and leading from one of said connections to one set of the fluid zones, a seccond passage in the stator completely on the same side of the rotor as the first passage and leading directly from only one zone of the other set of fluid zones to the other of said connections, and fluid passage means in the stator on the opposite side of the rotor connecting each of the remaining zones of said other set of fluid zones in series to the single fluid zone connected to the said second passage.

9. In a rotary fluid energy translating device the combination of a stator having inlet and outlet connections, a rotor mounted therein and forming a set of fluid inlet zones and a set of fluid delivery zones, a first passage in the stator completely on one side of the rotor and leading from one of said connections to one set of the fluid zones, a second passage in the stator completely on the same side of the rotor as the first passage and leading directly from only one zone of the other set of fluid zones to the other of said connections, fluid passage means in the stator on the opposite side of the rotor connecting each of the remaining zones of said other set of fluid zones in series to the fluid zone connected to the said second passage, and a drive shaft operatively connected to the rotor and extending from the stator on the side thereof having the said first and second passages.

10. In a rotary, vane fluid energizing device the combination of a housing having a working chamber and externally located inlet and outlet connections, a rotor carrying a plurality of movable vanes and mounted in the chamber to form a set of fluid inlet zones and a set of fluid delivery zones through which the vanes pass as the rotor turns, a branched passage in the housing leading from one of said connections directly to one set of the fluid zones and completely on one side of the rotor, a second passage in the housing on the same side of the rotor as the first passage and leading directly from only one zone of the other set of fluid zones to the other of said connections, and fluid passage means in the housing on the opposite side of the rotor connecting the remainder of the zones of said other set of fluid zones to the fluid zone from which the second passage leads.

11. In a rotary, vane fluid energy translating device the combination of a housing having a working chamber and externally located inlet and outlet connections, a rotor carrying a plurality of movable vanes and mounted in the chamber to form a set of fluid inlet zones and a set of fluid delivery zones through which the vanes pass as the rotor turns, a branched passage in the housing leading from one of said connections directly to one set of the fluid zones and completely on one side of the rotor, a second passage in the housing on the same side of the rotor as the first passage and leading directly from only one zone of the other set of fluid zones to the other of said connections, fluid passage means in the housing on the opposite side of the rotor connecting the remainder of the zones of said other set of fluid zones to the fluid zone from which the second passage leads, and a drive shaft operatively connected to the rotor and extending from the housing on the side thereof having the first and second passages.

12. In a rotary fluid energy translating device the combination of a stator having an inlet and a delivery connection, a rotor mounted in the stator and forming a set of fluid inlet zones and a set of fluid delivery zones, means forming two passages in the stator, one of which is branched and connects one set of fluid zones in parallel to one of the connections, the second of which directly connects only one zone of the other set of fluid zones to the other connection, and a third passage means connecting each of the remaining zones of said other set of fluid zones in series to the single fluid zone of said set which is connected to the second passage.

13. In a rotary fluid energy translating device the combination of a stator having an inlet and a delivery connection, a rotor mounted in the stator and forming a set of fluid inlet zones and a set of fluid delivery zones, means forming two passages in the stator, one of which is branched and connects one set of fluid zones in parallel to one of the connections, the second of which connects only one zone of the other set of fluid zones to the other connection, said connections and passages being completely on one side of the rotor, and a third passage means completely on the opposite side of the rotor connecting each of the remaining zones of said other set of fluid zones in series to the single fluid zone of said set which is connected to the second passage.

References Cited in the file of this patent

UNITED STATES PATENTS

| | | |
|---|---|---|
| 1,635,006 | Oliver | July 5, 1927 |
| 1,989,900 | Vickers | Feb. 5, 1935 |
| 2,098,652 | Buckbee | Nov. 9, 1937 |
| 2,202,911 | Johnson | June 4, 1940 |
| 2,255,785 | Kendrick | Sept. 16, 1941 |
| 2,330,565 | Eckart | Sept. 28, 1943 |
| 2,335,284 | Kendrick | Nov. 30, 1943 |
| 2,387,761 | Kendrick | Oct. 30, 1945 |
| 2,487,721 | Minshall | Nov. 8, 1949 |
| 2,544,987 | Gardiner et al. | Mar. 13, 1951 |

FOREIGN PATENTS

| | | |
|---|---|---|
| 892,075 | France | 1944 |